Patented Nov. 9, 1926.

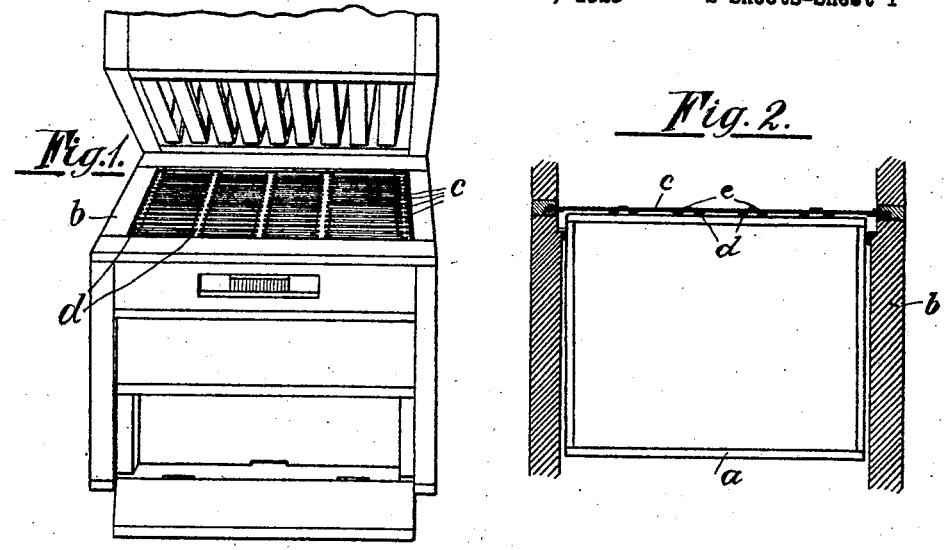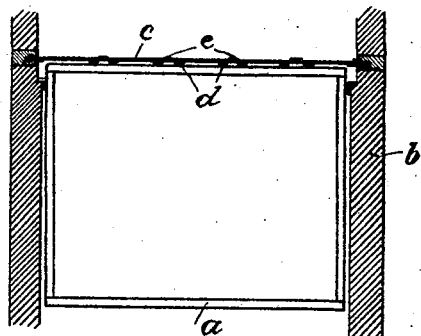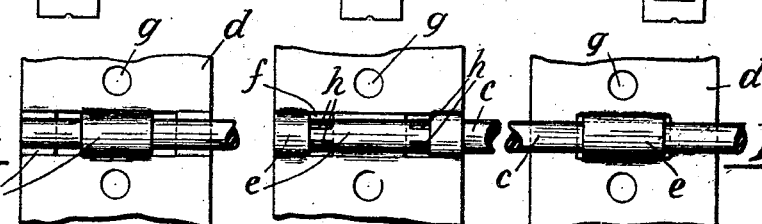

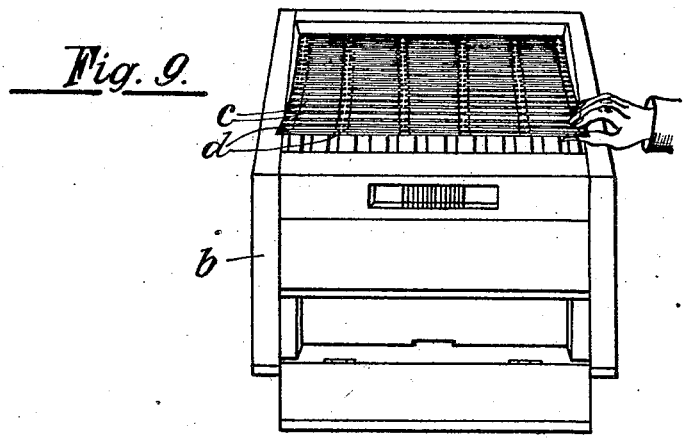
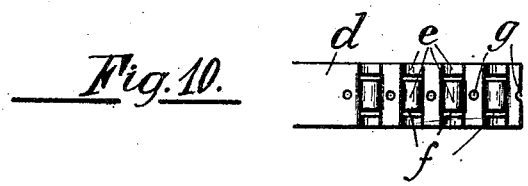
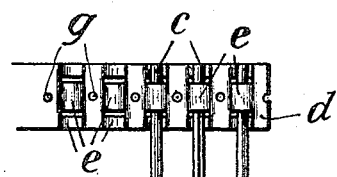
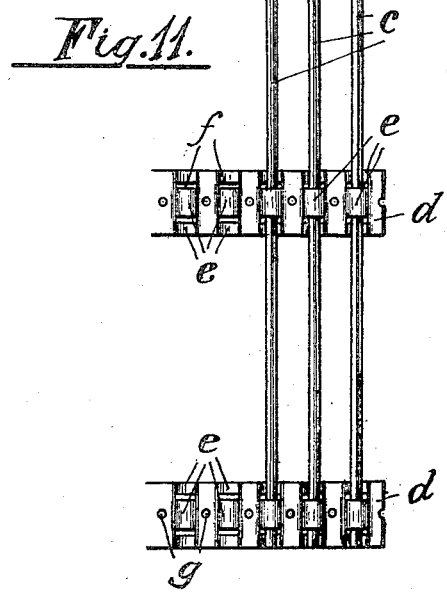

1,605,948

UNITED STATES PATENT OFFICE.

EUGEN HERZOG, OF SCHRAMBERG, GERMANY.

GRATING OR LATTICE FOR SHUTTING OFF THE QUEEN IN A BEEHIVE.

Application filed November 26, 1923, Serial No. 676,997, and in Germany August 31, 1923.

My invention relates to an improved grating or lattice for use in connection with bee-hives of any kind, and intended to shut-off the queen or mother-bee, that is to say, to restrict it to one space, whereas the working bees are perfectly free to pass through that grating or lattice, without any damage to their hair, as well as without any diminishment of the ventilation of the hive. The object of the invention is to increase the production of honey and to confine this latter and the brood to separate spaces.

An essential feature to attain the objects in view is to make the passages of the grating or lattice absolutely uniform in width in order to prevent the queen from finding access to honey space, and another important feature is that there are no sharp edges at said passages apt to do damage to the hair of the bees. A third feature consists therein that the grating or lattice requires only little space so that the passage is not impeded and the ventilation not impaired.

None of the known gratings or lattices intended for purposes of the kind here in view is able to answer the requirements. The wooden gratings or railings suffer from the drawback that their wooden rods or bars require too much space whereby the passage is impeded and the ventilation is impaired. This is detrimental especially in the summer months, i. e. that time in which the hive is in operation, the result being a decrease in the production of honey. Another deficiency of the wooden railings or lattices resides in the parts warping at changes of the weather whereby the indispensably requisite uniform distance between the wooden rods or bars is rendered ununiform so that the queen can get access to the upper space of the hive whereby attaining the object aimed at is rendered impossible.

Also the shutting-off gratings or lattices consisting of perforated sheet-metal plates are possessed of the drawback that the passage, as well as the ventilation, are rendered difficult, and that it is practically impossible to manufacture such a grating or lattice free from the dangerous bur at which the bees hurt themselves easily when passing through the gaps or holes, and do damage to their hair. When a working-bee has damaged its hair it can no more render the service due to it as the hair is required for gathering the pollen or flower-dust.

The disadvantages adhering to the known gratings or lattices for bee-hives and intended for such objects as stated above in the second paragraph are perfectly obviated in and by my improved construction which consists of accurately uniformly spaced wires and of flexible metal strips to which these wires are attached. In a preferred form of construction the metal strips are provided with eyes formed out of the strips themselves and serving as means for connecting the latter with said wires. The eyes may lie on only one side of the metal strips or on both sides, in either case in such a position that all wires lie in one plane.

Manufacturing these gratings or lattices proceeds in this way that smooth strips of sheet-metal are worked in a punch or the like in such a manner that eyes are formed out of parts of the flexible sheet-metal strips themselves, the eyes being perfectly accurately spaced and their inner diameter corresponding exactly to the diameter of the wire-pieces which they are to receive in order to form the grating or lattice in connection with them. This manner of manufacturing warrants the production of a grating or lattice which is perfectly uniform throughout its entire area and can be manufactured quickly and at low costs. Another advantage resides in the feature that this framing or lattice is flexible whereby inserting it into the hive, or removing it therefrom, is greatly facilitated. The frame or lattice when being in its place in the hive is, as is known, luted around its rims by the bees, in consequence of which it is possible to peel it off the frame, after it has been laid bare at one of its corners, like a piece of oilcloth, without in the least disturbing the bees thereby. In contra-distinction to this a stiff or rigid grating or lattice requires the application of a ripping chisel or similar tool in order to separate the firmly luted grating or lattice from the frame, because such a grating or lattice cannot be peeled off the grate like my improved one; and as the ultimate separation cannot be effected otherwise than with a sudden and somewhat strong jerk, which is felt throughout the whole hive, a great sensation is caused among the bees which then cease to work until they have calmed down again, which, however, requires sometimes about two hours. The disquieted or alarmed bees suck themselves full with honey, the quantity amounting, in a hive of normal size, to about 3-4 pounds, and this amount of honey takes part in the digestion process whereby about one third of said amount gets lost. To this loss must be added the other loss caused by the inactivity of the bees during the time in which the digestion process is going on.

My invention is illustrated by way of example in the accompanying drawings, in which Figure 1 is a perspective representation of a box-shaped bee-hive with a grating or lattice of the new kind in its proper place, the upper part or cover of the box or hive being open. Figure 2 is a vertical section through the body part of said box or hive; Figure 3 is a plan of the grating or lattice drawn to a greatly enlarged scale in comparison to Figures 1 and 2; Figures 4, 5, 6, 7 and 8, show details of the means by which the wires of the grating or lattice and the metal strips are connected with each other, the figures being drawn on a still more enlarged scale; Figure 9 is an illustration similar to Figure 1, the cover being entirely removed and the grating or lattice slightly lifted; and Figures 10 and 11 show the manner of manufacturing the grating or lattice, as is all more fully described hereinafter.

In the example shown, $b$ (Figures 1, 2, and 9) is the box shaped bee-hive, and $a$ are the frames therein. Above these latter is located the queen shutting-off grating or lattice which consists of parallel flexible wires $c$ and of parallel metal strips $d$ located at right angles to the wires $c$. The strips $d$ are provided with eyes $e$ pressed out of them, each eye being preferably semi-circular in section and the eyes pertaining to a wire extending to both sides of the metal strip, as shown in Figures 4–6. The wires $c$ are passed through these eyes in the manner shown in the just-mentioned figures, are firmly retained therein, and thus securely connected with the strips.

In the form of construction illustrated in Figures 4, 5 and 6, the eyes $e$ lie on both sides of the metal strip $d$, and gaps $f$ are left between the eyes of the two sides. The form of construction shown in Figures 7 and 8 is simplified in that the eyes extend to one side only. $h$ in Figure 6 denotes pairs of notches or the like, between which the metal of the wire is slightly compressed so as to form low projections by which shifting of the wire in the eyes is prevented. In the example shown each strip is connected with each wire by three eyes, of which the middle one is longer than the two lateral ones, the former being on the upper side and the other on the lower side of the strip. The arrangement may, however, be reversed, in that the middle eye is on the lower side and the lateral ones on the upper side, or there may be two eyes instead of three, as desired or preferred. $g$ are holes with the aid of which the strips may be adjusted and nailed fast where desired.

The breadth and thickness of the metal strips, and the material of which they are made, are so chosen that they can be easily bent, that is to say, the grating or lattice can be easily bent whereby placing it into the box or hive and removing it therefrom is greatly facilitated.

I claim:

1. In a bee-hive: in combination with equally spaced parallel wires: flexible sheet-metal strips having said wires attached to them.

2. In a bee-hive: in combination with equally spaced parallel wires: flexible sheet-metal strips, and eyes therein formed by parts thereof and receiving parts of said wires.

3. In a bee-hive: in combination with equally spaced parallel wires: flexible sheet-metal strips, and eyes therein formed by parts thereof, extending beyond the upper and the lower face thereof, and receiving parts of said wires.

4. In a bee-hive: in combination with equally spaced parallel wires: flexible sheet-metal strips, and eyes therein formed by parts thereof, extending beyond the upper and the lower face thereof and receiving parts of said wires; each strip having holes adapted to receive fastening means and being provided between the eyes encircling said wire-part, substantially as set forth.

5. In a bee-hive: in combination with equally spaced parallel wires: flexible sheet-metal strips, and eyes therein formed by parts thereof, extending beyond the upper and the lower face thereof, and receiving parts of said wires; each strip having holes adapted to receive fastening means and being provided between the eyes encircling said wire-parts, and projections provided on the wire-portions lying just over said holes, substantially as set forth.

In testimony whereof I affix my signature.

EUGEN HERZOG.